Patented Feb. 29, 1944

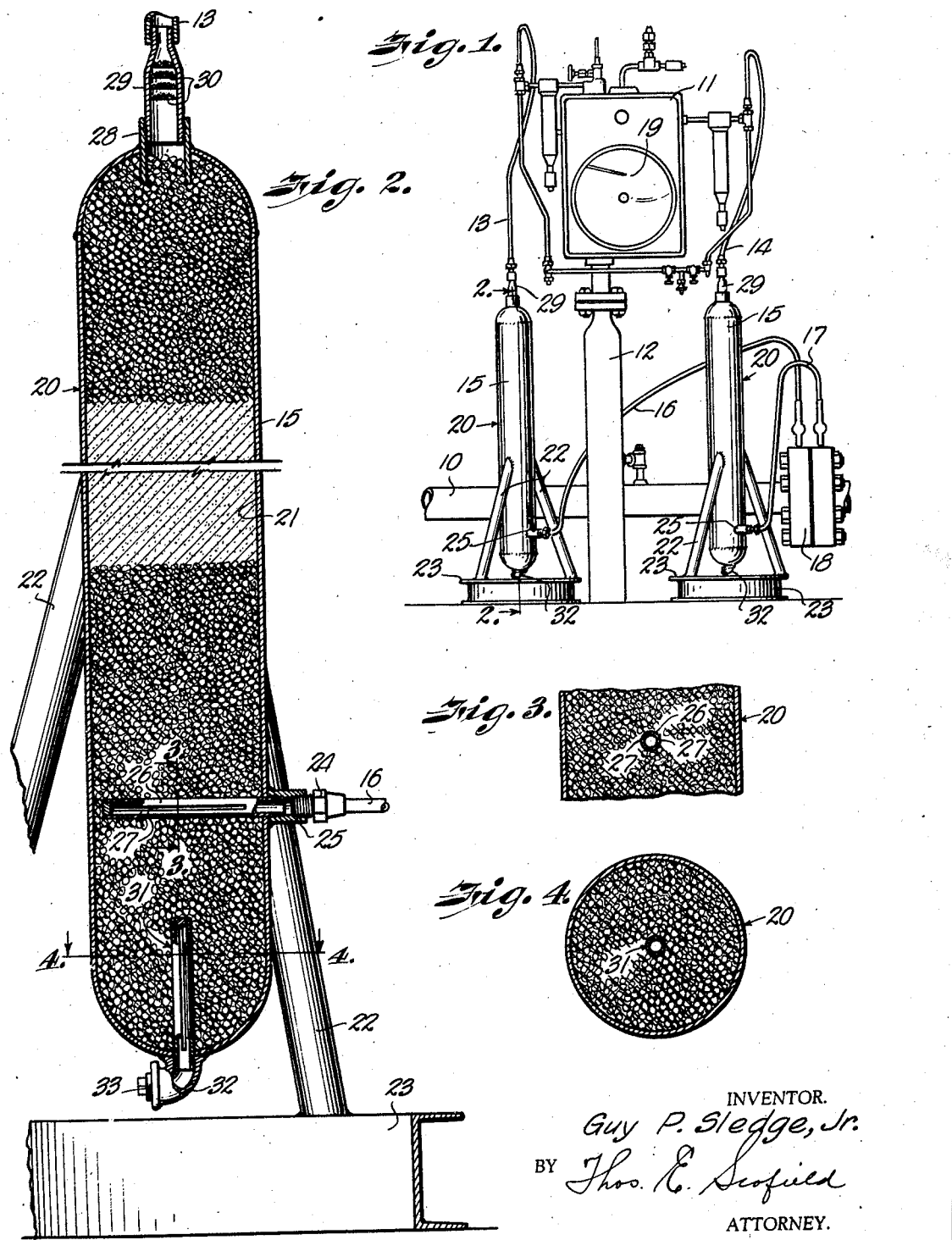

2,342,904

UNITED STATES PATENT OFFICE 2,342,904

GAS PULSATION DAMPENER FOR PRESSURE METERS

Guy P. Sledge, Jr., Ville Platte, La., assignor to Continental Oil Company, Ponca City, Okla., a corporation of Delaware Application November 10, 1941, Serial No. 418,442

2 Claims. (Cl. 138—41)

My invention relates generally to gas pulsation dampeners for pressure meters and more particularly to means for dampening pulsations in fluid transmission lines occasioned by pumps or compressors.

Liquids and gases are transported through transmission lines. The fluids are pumped into a flow line by suitable pumps or compressor units which develop the necessary pressure for fluid transmission. At each stroke of the pump or compressor, a surge pulsation or impulse is transmitted to the fluid in the line.

It frequently happens that it is necessary or desirable to register the pressure and rate of flow of the fluid through the line. For this purpose, high pressure line orifice meters are used. These meters register the difference in pressure across an orifice disk in the flow line and from this the rate of flow is determined. Experience with meters of this kind reveals that the surge or pulsation of the fluid in the line adversely affects the meter and causes it to record inaccurately.

An important object of my invention therefore is to provide a device that may be easily applied in the meter connecting line which will dampen these pulsations of the fluid.

Another object of my invention is the provision of a device of the above mentioned character that will so negative the effect of line pulsation on the meter as to permit the meter to record small differential changes as well as small pressure changes.

Still another object of my invention is to provide a device that is simple in construction, inexpensive to manufacture and efficient and efficacious in the performance of its duties.

Other objects and advantages of my invention will be apparent during the course of the following description.

In the drawing forming part of this specification and wherein like numerals are employed to designate like parts throughout the same, Fig. 1 is a front elevation showing a pulsation dampener embodying my invention, operatively associated with a high pressure orifice meter and a fluid flow line, Fig. 2 is an enlarged vertical sectional view taken on the line 2—2 of Fig. 1, Fig. 3 is a fragmentary vertical sectional view taken on the line 3—3 of Fig. 2, and Fig. 4 is a transverse sectional view taken on the line 4—4 of Fig. 2.

In the accompanying drawing wherein, for the purpose of illustration, is shown a preferred embodiment of my invention, the numeral 10 designates a conventional flow line for transporting fluids. A high pressure orifice meter 11 is mounted on a standard 12 beside the flow line. Connecting tubings 13 and 14 of the meter are attached to pressure dampeners 15 embodying my invention. Other tubings 16 and 17 connect the pressure dampeners with the manifold 18 of the flow line. Ordinarily, the tubings 16 and 17 are connected to or integral with tubings 13 and 14 so that the meter will register the pressure and rate of flow of the fluid on the dial 19. There is no actual flow of the fluid through the tubings unless there is a change of flow. When there is a change of flow in the flow line, there is a change in pressure drop across the orifice disk which causes the meter to change to the new conditions of flow. From 12 to 14 double acting compressors are usually connected to the flow line. These compressors all pumping into the same leader produce high frequency pulsations or impulses in the flow line fluid. These pulsations are transmitted to the meter through the fluid in the connecting tubes.

I have found that inaccuracies in the meter records, caused by pulsations in the fluid, may be eliminated by the insertion of pulsation dampeners of the type hereinafter described in each line of the meter.

Each of the pulsation dampeners 15 is identical in its construction and a detailed description of but one will therefore be given. The dampener comprises a hollow vertically elongated body 20 having an internal chamber 21 which contains a quantity of small particles or solids such as sand, gravel, or the like. The body is supported in an upright position by means of the braces 22, the lower ends of which connect with a suitable base such as the ring 23.

Tube 16 connects fluid from the flow line to the body. The end of the tube is provided with a nipple 24 which connects with the union 25 projecting radially from the body wall substantially above the floor of the chamber 21. A tubular strainer 26 connected to the union projects radially into the chamber. The distal end of the strainer is closed and the side wall thereof is provided with longitudinal slots 27 which permit the fluid to disperse through the chamber but prevent the small solids therein from entering the fluid inlet.

Fluids may pass from chamber 21 through the outlet port in which the union 28 is fitted. I have here illustrated the union 28 as being somewhat larger than the inlet 25 to permit the solids to be more easily introduced into the chamber. A reduction coupling 29 connects the union 28 to tubing 13 of the meter. Several pieces of screening 30 are arranged transversely of the coupling to prevent solids within the body from entering the coupling and forming an obstruction in tube 13.

In actual practice I have found that clean gravel of the size known as pea gravel operates satisfactorily in dampening the pulsations of the fluid traversing the chamber. This material is inexpensive and may be frequently replaced, if desired. In the transmission of gas a small amount of oil from the compressors may enter the flow line and eventually a portion of this oil finds its way into the chamber. This oil will collect on the solids in the chamber and adversely affect the functioning of the meter. At intervals, therefore, the solids must either be washed with distillate or replaced. I have found that ordinary gravel is satisfactory and that it may be easily and inexpensively replaced.

While satisfactory results are obtained if the chamber is filled with gravel, in some instances it may be necessary or advantageous to provide an intermediate layer of coarse sand as illustrated in Fig. 2. I have found that gravel is satisfactory under most conditions and that superposed layers of gravel and sand operate satisfactorily under all conditions heretofore encountered.

While I have described the body as being filled with sand and gravel, I do not intend to limit my invention to the use of any particular material within the body chamber. These materials are inexpensive and perform satisfactorily; however, any material possessing like characteristics will perform equally as well. As long as the internal chamber of the body is filled with small particles or solids, the desired result will be realized.

Pulsations in the fluid heat the lower portion of the body as well as the solids contained therein and as the fluid rises through the heated portion of the body, all moisture will be removed therefrom. The moisture condensate collecting in the bottom of the chamber below the inlet port may be discharged through the drain 31. I have here illustrated the drain as a tubular strainer extending through the bottom of the body or chamber and having longitudinal slots which permit the condensed moisture to be discharged but prevent granular solids in the chamber 21 from discharging through the drain or forming an obstruction therein. The discharge strainer 31 connects to an elbow 32 which is closed at its outlet side by a removable plug 33. The drain is normally closed and is only opened to permit accumulated condensate to drain from the chamber 21 when the meter is not in use.

The meter of the type here illustrated is provided with two tubings designated by the numerals 13 and 14. A pulsation dampener of the type described is connected to each of the tubings and, if optimum results are to be obtained, the granular materials in the chamber are preferably of substantially the same size and in similar stratified arrangement. I have found that a dampener of the above mentioned character negates the adverse effects of fluid pulsations on the meter and causes the same to record satisfactory, uniform, and accurate readings.

It is to be understood that the form of my invention herein shown and described is to be taken as a preferred example of the same and that various changes in the size, shape and arrangement of parts may be resorted to without departing from the spirit of my invention or the scope of the appended claims.

Having thus described my invention, I claim:

1. A pulsation dampener comprising a vertically elongated hollow body, permeable aggregate in the body, a fluid inlet substantially above the bottom of the body, a tubular strainer extending from the inlet transversally into said aggregate, a fluid outlet at the top of the body, and means for draining moisture accumulating in the bottom of the body.

2. A pulsation dampener comprising a vertically elongated hollow body, permeable aggregate in the body, a fluid inlet substantially above the bottom of the body, a tubular strainer extending from the inlet transversally into said aggregate, a fluid outlet at the top of the body, a fluid opening in the bottom of the body, and a tubular strainer extending from the opening upwardly into the aggregate.

GUY P. SLEDGE, Jr.